United States Patent
Narayan et al.

(10) Patent No.: US 8,008,373 B2
(45) Date of Patent: Aug. 30, 2011

(54) BIODEGRADABLE POLYMER MASTERBATCH, AND A COMPOSITION DERIVED THEREFROM HAVING IMPROVED PHYSICAL PROPERTIES

(75) Inventors: Ramani Narayan, Okemos, MI (US); Sunder Balakrishnan, Tamil Nadu (IN); Donald A. Kubik, Dickenson, ND (US); Mehmet A. Gencer, Brecksville, OH (US)

(73) Assignee: Northern Technologies International Corp., Beachwood, OH (US)

( * ) Notice: Subject to any disclaimer, the term of this patent is extended or adjusted under 35 U.S.C. 154(b) by 646 days.

(21) Appl. No.: 11/981,003

(22) Filed: Oct. 31, 2007

(65) Prior Publication Data

US 2008/0064812 A1 Mar. 13, 2008

Related U.S. Application Data

(63) Continuation-in-part of application No. 10/805,137, filed on Mar. 20, 2004, now abandoned, which is a continuation-in-part of application No. 10/676,752, filed on Oct. 1, 2003, now Pat. No. 7,270,775, which is a continuation-in-part of application No. 10/453,304, filed on Jun. 3, 2003, now abandoned, which is a continuation-in-part of application No. 10/396,067, filed on Mar. 25, 2003, now abandoned, which is a continuation-in-part of application No. 10/054,031, filed on Jan. 22, 2002, now abandoned, which is a continuation-in-part of application No. 10/054,032, filed on Jan. 22, 2002, now abandoned.

(51) Int. Cl.
*C08J 3/20* (2006.01)

(52) U.S. Cl. ........ 523/351; 523/124; 523/125; 523/126; 523/127

(58) Field of Classification Search .................. 523/351, 523/124–127
See application file for complete search history.

(56) References Cited

U.S. PATENT DOCUMENTS

| | | |
|---|---|---|
| 2,629,649 A | 2/1953 | Wachter et al. |
| 2,711,360 A | 6/1955 | Wachter et al. |
| 2,717,843 A | 9/1955 | Wachter et al. |
| 2,739,871 A | 3/1956 | Senkus |
| 2,829,080 A | 4/1958 | Fessler et al. |
| 2,986,447 A | 5/1961 | Raifsnider |
| 3,080,211 A | 3/1963 | Fessler et al. |
| 3,110,684 A | 11/1963 | Miller |
| 3,304,267 A | 2/1967 | Miller |
| 3,398,095 A | 8/1968 | Judd |
| 3,433,577 A | 3/1969 | Shick |
| 3,626,083 A | 12/1971 | Minter |
| 3,785,975 A | 1/1974 | Humphrey |
| 3,967,926 A | 7/1976 | Rozenfeld et al. |
| 4,051,066 A | 9/1977 | Miksic et al. |
| 4,098,720 A | 7/1978 | Hwa |
| 4,217,216 A | 8/1980 | Lipinski |
| 4,626,283 A | 12/1986 | Martins et al. |
| 4,782,106 A | 11/1988 | Fricke et al. |
| 4,891,404 A | 1/1990 | Narayan et al. |
| 4,944,916 A | 7/1990 | Franey |
| 4,973,446 A | 11/1990 | Bernhard et al. |
| 4,973,448 A | 11/1990 | Carlson et al. |
| 4,983,661 A | 1/1991 | Ali et al. |
| 5,037,708 A | 8/1991 | Davitz |
| 5,053,482 A | 10/1991 | Tietz |
| 5,097,004 A | 3/1992 | Gallagher et al. |
| 5,097,005 A | 3/1992 | Tietz |
| 5,139,700 A | 8/1992 | Miksic et al. |
| 5,154,886 A | 10/1992 | Franey et al. |
| 5,171,308 A | 12/1992 | Gallagher et al. |
| 5,180,762 A | 1/1993 | Canova |
| 5,209,869 A | 5/1993 | Miksic et al. |
| 5,219,646 A | 6/1993 | Gallagher et al. |
| 5,264,030 A | 11/1993 | Tanabe et al. |
| 5,292,783 A | 3/1994 | Buchanan et al. |
| 5,320,778 A | 6/1994 | Miksic et al. |

(Continued)

FOREIGN PATENT DOCUMENTS

| | | |
|---|---|---|
| EP | 0 366 305 | 5/1990 |
| EP | 1 389 630 | 2/2004 |
| HU | 48857 | 7/1989 |
| WO | 02/27069 | 4/2002 |
| WO | 03/060197 | 7/2003 |
| WO | 03/062313 | 7/2003 |
| WO | 03/062346 | 7/2003 |

OTHER PUBLICATIONS

BASF, Product Information, Apr. 2007, Version 1.0, Ecoflex® Batch AB—Antiblocking agents for Eccoflex® F BX 7011—the biodegradable Polyester for compostable film.

*Primary Examiner* — Edward Cain
(74) *Attorney, Agent, or Firm* — Hudak, Shunk & Farine Co. LPA

(57) ABSTRACT

A biodegradable thermoplastic polymer masterbatch composition comprising a blend of at least one biodegradable thermoplastic polymer containing high loading of a particulate filler uniformly dispersed therein. The amount of the biodegradable thermoplastic polymer is generally from about 25% to about 50% by weight and the amount of the filler is from about 75% to about 50% by weight, based upon the total amount of one biodegradable polymer and the at least one filler. The uniform dispersion of the fillers is desirably obtained by adding small particles of the filler to a melt of the biodegradable polymer and blending using high shear equipment with special screw geometry. The masterbatch composition is then physically blended with additional biodegradable thermoplastic polymer and extrusion processed into final articles such as blown and cast films, molded products, and the like. The masterbatch multi-stage approach of the present invention results in a product that has improved physical properties and lower costs over that of a one step blend of the same amount of a biodegradable thermoplastic polymer and a filler that is subsequently heat formed into a final product.

30 Claims, 1 Drawing Sheet

U.S. PATENT DOCUMENTS

| | | |
|---|---|---|
| 5,324,448 A | 6/1994 | Mayeaux |
| 5,344,589 A | 9/1994 | Miksic et al. |
| 5,446,079 A | 8/1995 | Buchanan et al. |
| 5,462,983 A | 10/1995 | Bloembergen et al. |
| 5,500,465 A | 3/1996 | Krishnan et al. |
| 5,559,171 A | 9/1996 | Buchanan et al. |
| 5,580,911 A | 12/1996 | Buchanan et al. |
| 5,593,624 A | 1/1997 | Lewis |
| 5,599,858 A | 2/1997 | Buchanan et al. |
| 5,715,945 A | 2/1998 | Chandler |
| 5,801,224 A | 9/1998 | Narayan et al. |
| 5,817,195 A | 10/1998 | Davitz |
| 5,817,721 A | 10/1998 | Warzelhan et al. |
| 5,855,975 A | 1/1999 | Miksic et al. |
| 5,863,991 A | 1/1999 | Warzelhan et al. |
| 5,871,668 A | 2/1999 | Heimann et al. |
| 5,880,078 A | 3/1999 | Bevilacqua, Jr. et al. |
| 5,882,441 A | 3/1999 | Davitz |
| 5,883,199 A | 3/1999 | McCarthy et al. |
| 5,900,322 A | 5/1999 | Buchanan et al. |
| 5,906,783 A | 5/1999 | Narayan et al. |
| 5,916,372 A | 6/1999 | Bevilacqua, Jr. et al. |
| 5,928,796 A | 7/1999 | Heimann et al. |
| 5,938,976 A | 8/1999 | Heimann et al. |
| 5,958,115 A | 9/1999 | Böttcher et al. |
| 5,969,089 A | 10/1999 | Narayan |
| 5,981,619 A * | 11/1999 | Shikinami et al. ............ 523/113 |
| 5,983,598 A | 11/1999 | Quinones |
| 6,010,984 A | 1/2000 | Heimann et al. |
| 6,010,985 A | 1/2000 | Heimann et al. |
| 6,017,857 A | 1/2000 | Heimann et al. |
| 6,028,160 A | 2/2000 | Chandler et al. |
| 6,054,512 A | 4/2000 | Nelson et al. |
| 6,080,334 A | 6/2000 | Heimann et al. |
| 6,139,652 A | 10/2000 | Carrano et al. |
| 6,156,929 A | 12/2000 | Chandler et al. |
| 6,165,284 A | 12/2000 | Shubkin |
| 6,190,779 B1 | 2/2001 | Heimann et al. |
| 6,201,034 B1 | 3/2001 | Warzelhan et al. |
| 6,224,957 B1 | 5/2001 | Crook et al. |
| 6,242,371 B1 | 6/2001 | Quinones |
| 6,316,392 B1 | 11/2001 | Heimann et al. |
| 6,321,907 B1 | 11/2001 | Honstrater |
| 6,331,509 B1 | 12/2001 | Heimann et al. |
| 6,414,108 B1 | 7/2002 | Warzelhan et al. |
| 7,256,223 B2 * | 8/2007 | Mohanty et al. .............. 523/124 |
| 2003/0031583 A1 | 2/2003 | Reinhard |
| 2003/0220436 A1 | 11/2003 | Gencer |
| 2004/0063837 A1 | 4/2004 | Kubik et al. |
| 2004/0069972 A1 | 4/2004 | Kubik et al. |
| 2004/0248486 A1 | 12/2004 | Hodson |
| 2005/0182196 A1 | 8/2005 | Khemani et al. |

* cited by examiner

BIODEGRADABLE POLYMER MASTERBATCH, AND A COMPOSITION DERIVED THEREFROM HAVING IMPROVED PHYSICAL PROPERTIES

CROSS-REFERENCE TO RELATED APPLICATIONS

This application is a continuation-in-part application of Ser. No. 10/805,137, filed Mar. 20, 2004, which is a continuation-in-part application of Ser. No. 10/676,752 filed 1 Oct. 2003, which is a continuation-in-part application of Ser. No. 10/453,304 filed 3 Jun. 2003, which is a continuation-in-part application of Ser. No. 10/396,067 filed 25 Mar. 2003, which is a continuation-in-part application of Ser. Nos. 10/054,031 and 10/054,032, both filed on 22 Jan. 2002, all of which are hereby fully incorporated by reference.

FIELD OF THE INVENTION

The present invention relates to a masterbatch comprising a completely biodegradable thermoplastic polymer (bioplastic polymer or biopolymer), having high loadings of uniformly dispersed particulate filler, and to polymeric articles derived therefrom having improved properties. By "completely biodegradable" is meant that the polymer meets ASTM D 6400 and ISO 17088 standards of biodegradability and is essentially completely biodegraded or assimilated by microorganisms in a composting environment in less than one year. The term "particulate fillers" as used herein refers to inorganic fillers as in the form of small particles and desirably include talc, calcium carbonate, magnesium carbonate, silica, alumina, mica, clay, titanium dioxide, pumice, zeolite, and the like, as well as glass beads, hollow glass spheres, microspheres, and porous ceramic spheres. The term "particulate fillers" also includes organic fillers as in the form of particles or fibers such as cellulose, starch, proteins, and lignocellulosics.

BACKGROUND OF THE INVENTION

U.S. Pat. No. 5,817,721 relates to a biodegradable polyester obtainable by reacting a mixture comprising
(a1) from 95 to 99.9% by weight of a polyester P1 obtainable by reacting a mixture essentially comprising
(b1) a mixture comprising
35-95 mol % of adipic acid or ester-forming derivatives thereof,
5-65 mol % of terephthalic acid or ester-forming derivatives thereof, and
0-5 mol % of a compound containing sulfonate groups, and
(b2) a dihydroxy compound selected from the group consisting of $C_2$-$C_6$-alkanediols and $C_5$-$C_{10}$-cycloalkanediols,
with the proviso that a compound D with at least three groups capable of ester formation is employed to prepare the polyester P1,
(a2) from 0.1 to 5% by weight of a divinyl ether C1 and
(a3) from 0 to 5 mol %, based on component (b1) from the preparation of P1, of compound D,
and other biodegradable polymers and thermoplastic molding compositions, and also processes for the preparation thereof, the use thereof for producing biodegradable moldings and adhesives.

U.S. Pat. No. 5,883,199 relates to biodegradable blends including a first, polylactic acid-based polymer or copolymer, and a second polymer or copolymer including one or more polyesters, e.g., an aliphatic polyester or a polyester of one aliphatic $C_2$ to $C_{20}$ diacid or of a combination of two more different aliphatic $C_2$ to $C_{20}$ diacids, wherein the first and second polymers are present in a ratio of 9:1 to 1:9, are described.

U.S. Pat. No. 6,201,034 relates to biodegradable polyesters P1 obtainable by reaction of a mixture consisting essentially of
(a1) a mixture consisting essentially of
from 35 to 95 mol % of adipic acid or ester-forming derivatives thereof or mixtures thereof,
from 5 to 65 mol % of terephthalic acid or ester-forming derivatives thereof or mixtures thereof, and
from 0 to 5 mol % of a sulfonate compound, the sum of the individual mole percentages being 100 mol %, and
(a2) a dihydroxy compound selected from the group consisting of $C_2$-$C_6$-alkanediols and $C_5$-$C_{10}$-cycloalkanediols,
the molar ratio of (a1) to (a2) being chosen within the range from 0.4:1 to 1.5:1,
with the proviso that the polyesters P1 have a molecular weight ($M_a$) within the range from 5000 to 50,000 g/mol, a viscosity number within the range from 30 to 350 g/ml (measured in 50:50 w/w o-dichlorobenzene/phenol at a concentration of 0.5% by weight of polyester P1 at 25° C.) and a melting point within the range from 50 to 170° C. and with the further proviso that the polyesters P1 are prepared using from 0.01 to 5 mol %, based on the molar quantity used of component (a1), of a compound D having at least three groups capable of ester formation, and further biodegradable polymers and thermoplastic molding compositions, and also processes for the preparation thereof.

U.S. Pat. No. 6,414,108 relates to biodegradable polyether esters P1 obtainable by the reaction of a mixture consisting essentially of: (a1) a mixture essentially of 20 to 95 mol % adipic acid or ester-forming derivatives thereof or mixtures thereof, 5 to 80 mol % terephthalic acid or ester-forming derivatives thereof or mixtures thereof, and 0 to 5 mol % of a sulphonate group-containing compounds In which the sum of the individual mol percentages is 100; and (a2) a mixture of dihydroxy compounds consisting essentially of (a21) 15 to 99 mol % of a dihydroxy compound selected from the group consisting of $C_2$-$C_6$ alkane diols and $C_5$-$C_{10}$ cycloalkane diols; (a22) 85 to 0.2 mol % of an ether function-containing dihydroxy compound as in formula I HO—[$(CH_2)_n$—O]$_m$—H in which n is 2, 3 or 4 and m is a whole number from 2 to 250, or mixtures thereof, in which the molar ratio of (a1) to (a2) is in the range from 0.4:1 to 1.5:1 with the proviso that the polyether esters P1 have molar weight ($M_n$) in the range from 5,000 to 80,000 g/mol, a viscosity index in the range from 30 to 450 g/ml (measured in o-dichlorobenzole/phenol (weight ratio 50/50) at a concentration of 0.5 wt. % polyether esters P1 at a temperature of 25° C.) and a melting point in the range from 50 to 200° C., and with the further proviso that from 0.01 to 5 mol %, in relation to the molar quantity of the components (a) used of a compound D with at least three groups capable of ester formation are used to produce the polyether esters P1, and a process for their production.

U.S. Publication No. 2004/0248486 relates to fibrous sheets that are coated or impregnated with a biodegradable composition to allegedly render the sheets more resistant to penetration by liquids. Biodegradable polymer blends suitable for use in coating or impregnating a fibrous sheet can be manufactured from at least one "hard" biodegradable polymer and at least one "soft" biodegradable polymer. "Hard"

biopolymers typically have a glass transition temperature of at least about 10° C. "Soft" biodegradable polymers typically have a glass transition temperature less than about 0° C. Another biodegradable polymer composition includes one or more biodegradable polymers and sufficient inorganic filler so as to allegedly render the treated sheet microwaveable.

SUMMARY OF THE INVENTION

It is known in the art that biodegradable thermoplastics, typically polyesters, are very shear, temperature and moisture sensitive. It is an object of this invention to provide a high content of inorganic and organic fillers uniformly dispersed in a biodegradable thermoplastic resin, also called a masterbatch. It is a further object of the present invention that the masterbatch be used as a concentrate of fillers, and is readily diluted upon addition of a compounding resin such as additional biodegradable polymers that are desirably free of any additional fillers.

The masterbatch composition can be made by using twin-screw extrusion compounding techniques using new screw geometry. The highly filled biodegradable thermoplastic materbatch compositions of the present invention can be physically mixed with the required percent of biodegradable thermoplastic polymer resin, and extrusion processed into final product articles such as films and molded products without subjecting all of the resin to two heat histories, thereby providing for improved performance properties, processability, and reduced cost. Heretofore, it has been difficult to provide high filler loadings, particularly in a shear and temperature sensitive polymer.

A biodegradable masterbatch composition comprises from about 25% to about 50% by weight of at least one biodegradable thermoplastic polymer melt blended with from about 50% to about 75% by weight of at least one non-meltable, inorganic and/or organic filler. Melt blending desirably occurs at a temperature above the highest melting point of the one or more biodegradable thermoplastic polymers. The particulate fillers are uniformly dispersed in the biodegradable thermoplastic resin with at least 75% of the particles having a size of from about 0.5 to about 40 microns. In order to obtain uniform dispersion of the particulate fillers in the biodegradable thermoplastic and maintain its molecular weight, it is important that the particulate fillers be dried to a low moisture content of generally less than about 0.05% by weight, and desirably less than about 200 ppm by weight.

Uniform dispersion is important inasmuch as it produces better packing, processability, especially as it relates to blown film applications, thin gauge films, and improved performance properties. The term "uniform dispersion" means that the uniformity of dispersed particles in the resin, and the final article, sheet, film, etc. can be quantified by known analytical techniques. Thus, for example, a masterbatch composition having a high filler loading is extruded through a blown film apparatus to produce a film having about a 0.025 mm (1 mil) thickness. This film is placed over a light source of appropriate wavelength and intensity to enable one to quantify the number of particles which show up as "imperfections"; and the size of each is also visible under appropriate magnification. No unit area, e.g. at least 1 square inch of the film, appears to have a substantially higher concentration of particles than another. That is, the variation in population density (e.g. particle distribution) of the particles is less than about ±20% and preferably less than about ±10%. Another method to determine uniform distribution is to sample the filled thermoplastic resin extrudate as it comes out of the extruder and determine whether the percent of particulate fillers and sizes present as computed are within the ranges set forth herein below concerning particle size.

Once a compatiblized masterbatch blend of the biodegradable thermoplastic polymer and a high loading of uniformly dispersed particulate fillers therein has been formed, it is subsequently mixed with one or more biodegradable thermoplastic polymers in a second stage and extrusion processed in a standard extruder to form final end products such as a film, a sheet, or an article, and the like. A major result of the two stage process of the present invention is that significantly unexpected and improved physical properties are obtained such as strength at break load and at peak load, elongation at break load and at peak load, dart impact, and tear. The biodegradable thermoplastic polymer inorganic filler composition after the subsequent or second stage mixing and extrusion processing stage desirably contains from about 55% by weight to about 85% or about 90% by weight of the biodegradable thermoplastic polymer and accordingly from about 10% or about 15% by weight to about 45% by weight of the particulate fillers based upon the total combined weight/mass of all biodegradable thermoplastic polymer and particulate fillers. The amount of the biodegradable, thermoplastic polymer added in the second mixing stage that is subjected to only one heat history, is significant and often well in excess of 50% by weight/mass of the total weight/mass of all biopolymers.

DETAILED DESCRIPTION OF THE INVENTION

Figure 1:
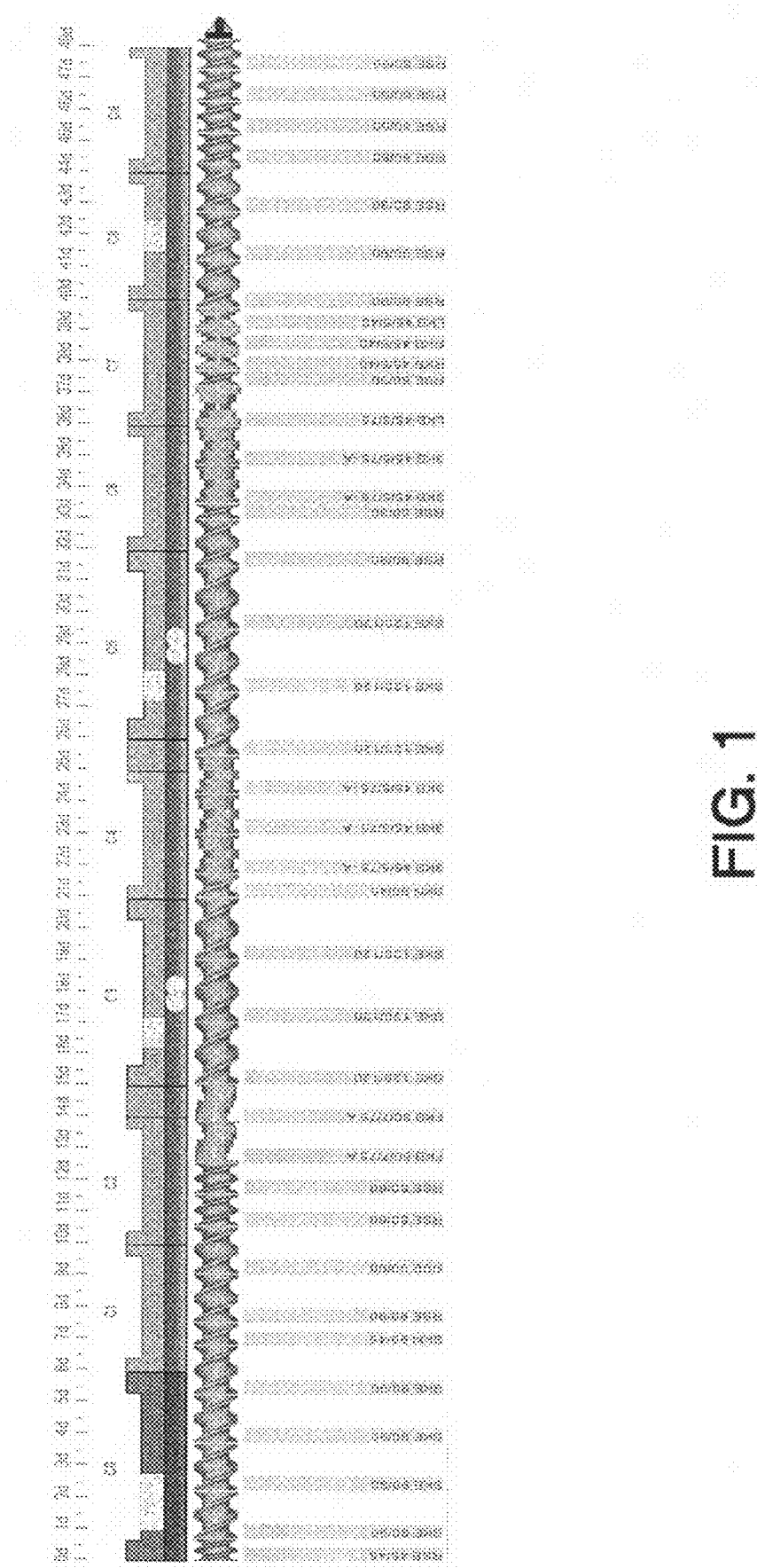
FIG. 1 is a picture of an extruder screw that can be utilized in the present invention performing the masterbatch.

As previously noted, an important aspect of the present invention is that the biodegradable polymers (biopolymers) have a uniform dispersion of particulate fillers therein. Generally, any bipolymers known to the art and to the literature such as various polyesters can be utilized and desired bipolymers include polylactic acid and other related polymers such as polylactic acid-based polymers, copolymers, and blends thereof; various polyesters including aliphatic-aromatic copolyesters such as modified polyaliphatic terephthalates; various biodegradable aliphatic polyesters such as a polyhydroxy-alkanoate, or a succinate based aliphatic polyester, or a polycaprolactone or a polymer derived therefrom; various biodegradable polyesteramides or a copolymer thereof; and various biodegradable cellulose esters or a derivative thereof. Such polymers are commercially available from a number of companies including BASF, Natureworks, DuPont, and Mitsui.

The polylactic acid (PLA) can have a molecular number average weight range of Mn from about 50,000 to about 110,000. In one embodiment, commercially available polylactic acid has a melting point of about 180° C.

The above-noted aliphatic-aromatic copolyesters include polyaliphatic terephthalate biopolymers as for example Biomax® biopolymers, available from DuPont, and are described in greater detail in U.S. Pat. Nos. 5,053,482 and 5,097,005 to Tietz; U.S. Pat. Nos. 5,097,004, 5,171,308, and 5,219,646 to Gallagher et al.; and U.S. Pat. No. 5,295,985 to Romesser et al. and are hereby fully incorporated by reference. Such biopolymers typically comprise essentially alternating terephthalate and an aliphatic units derived from one and preferably at least two diols, independently having from 2 to about 5 carbons, and such biopolymers are preferred. Biomax polymers have a melting point in the range from about 200-208° C.

Still other preferred aliphatic-aromatic copolyester biopolymers include those set forth in the examples presented below, as used for extruding or blowing film such as Ecoflex® (BASF), believed to be formed by reaction of at least one aliphatic acid such as an adipic acid, at least one aliphatic diol such as 1,4-butanediol and at least one alkyl substituted or nonsubstituted terephthalic acid such as dimethyl-terephthalate (DMT). This biopolymer has a melting point in the range from about 105° C.-115° C.

Other preferred aliphatic-aromatic copolyesters are disclosed in U.S. Pat. No. 5,817,721 to Warzelhan et al (BASF), and U.S. Pat. Nos. 5,292,783; 5,446,079; 5,559,171; 5,580,911; 5,599,858; and 5,900,322, to Buchanan et al (Eastman Chemical), and the same are hereby fully incorporated by reference.

Various aliphatic polyester biopolymers can be utilized such as hydroxyl containing polyesters containing a total of 2 to 12 carbon atoms, for example, various polyhydroxy-alkanoates such as polyhydroxybutyrate, polyhydroxyvalerate, and polyhydroxybutyrate-hydroxyvalerate copolymer, e.g. from Metabolix®, melting point about 170° C.), various succinate-based aliphatic polymers such as polybutylene succinate, polybutylene succinate adipate, and polyethylene succinate, e.g. (Bionolle® from Showa High Polymer, melting point about 114° C.), and polycaprolactone or polyesters derived from caprolactone, all of which are commercially available from manufacturers such as BASF, Daicel Chemical, Eastman Chemical, Monsanto, Showa Hight Polymer, Solvay, and Union Carbide. The various polycaprolactones (PCL), are formed by polymerizing ε-caprolactone. The polymer has a relatively low melting point of only 60° C. Because of this, PCL and other similar aliphatic polyesters with low melting points are difficult to process, tacky, and not suitable for many applications. Film made from PCL, and the other biopolyester resin compositions is tacky as extruded and has low melt strength near its melting point. Also, the slow crystallization of this polymer causes the properties to change over time. Blending PCL, and other similar polyesters, with the filler improves the processability of the polyesters and reduces tackiness. Commercially available PCLs are manufactured by Union Carbide (Tone®), Daicel Chemical, Ltd. and Solvay.

The various polyesteramides or copolymers thereof, that are moldable or extrudable, e.g. BAK 1095(BASF) are made as by reacting adipic acid, 1,4-butaneldiol and 6-aminocaproic acid and have a Mn of about 22,700, a weight average Mw of about 69,700, and a melting point of 125° C. A similar polyesteramide is BAK 2195 that has a melting point of 175° C. Still another polyesteramide is a terpolymer of polylactide, polyglycolide and polycaprolactone produced by Mitsui Chemicals, Inc. using a condensation reaction, three of which are sold under the designations H100J, S100 and T100. H100J has a melting point of 173° C.

Another biodegradable thermoplastic polymer of the present invention are various cellulose esters or derivatives thereof that are generally soluble within the above-noted biopolymers and include blends thereof.

The amount of the one or more biodegradable thermoplastics present in the masterbatch stage is generally from about 25% to about 50% by weight, desirably from about 30% to about 45% by weight, and preferably from about 35% to about 45% by weight, based upon the total weight of the one or more biopolymers and the one or more inorganic and/or organic fillers.

The inorganic or organic particulate fillers utilized does not melt or react with the biopolymer(s) or additives of the blend. The masterbatch compositions of the present invention containing one or more biodegradable thermoplastics and significant or large amounts of an organic or inorganic particulate filler have improved processability e.g. reduced melt stickiness, improved bubble stability, increased biodegradability, and reduced water vapor transmission rates (WVTR) such as about 30 g/100 in$^2$/day/mil (g water per 100 square inches per day normalized to a 1 mil. thickness according to ASTM E 398-03) or less compared to the original biopolymer having no filler. More desirably, the WVTR is about 25 or less or about 20 or less, and preferably about 15 or less and even about 10 or less. In molded end products, utilization of particulate filler provides for increased modulus and/or stiffness.

Preferred inorganic fillers include silica, talc, pumice, calcium carbonate, magnesium carbonate, mica, clay, alumina, titanium dioxide, zeolite, and the like which are dried to essentially anhydrous conditions before use. Examples of other useful inorganic fillers include glass beads, hollow glass spheres, microspheres, porous ceramic spheres, and the like. Preferred organic fillers are cellulose, starch, lignocellulosic materials, and proteinaceous materials.

The particulate fillers of the present invention are generally utilized in the masterbatch stage in high amounts such as from about 50% to about 75%, desirably from about 55% to about 70%, and preferably from about 55% to about 65% by mass/weight based upon the combined mass/weight of all biodegradable thermoplastics and all particulate fillers. The mean diameter of the particulate fillers is generally from about 0.5 to about 20, or about 30, or about 40 microns with generally at least about 75%, desirably at least about 85% and preferably at least about 95% by weight of all particles being within these ranges. Desirably, at least about 90% and more desirably at least about 95% by weight of the particles have a mean diameter of from about 1 to about 15 microns. At least about 50% or at least about 65% by weight of all the particles have a mean diameter of from about 2 to about 10 microns. At least about 35% or at least about 50% by weight of all the particles have a mean diameter of from about 2 to about 6 microns. Such particles, before they are added and melt blended with the one or more biodegradable polymers, are essentially anhydrous and have a moisture weight content of generally less than about 0.05% by weight, desirably less than about 200 ppm, and preferably less than about 100 ppm.

Though it may be desired in one embodiment to grind particles to calculated size ranges which will afford highest packing, it is found that a random distribution of sizes in the aforestated range, or a distribution in a typical bell-shaped curve, provides excellent packing and a high reduction in interstitial space (between particles) as the smaller particles occupy space between larger particles.

Although the particulate fillers can be added to a second stage, it is desirable that at least 75%, or 85%, preferably at least 95%, and more preferably that all or 100% by weight of the total particulate fillers in the final product be added in the masterbatch stage.

Various additives can be utilized in conventional amounts as well known to the literature and to the art and include various processing aids, molding aids, extrusion aids, colorants, slip agents, various alkali silicates such as sodium silicate, lubricants, flame retardants, pigments, and the like.

It is not a preferred aspect of the present invention to utilize inorganic vapor corrosion inhibitors such as various alkali metal molybdates and various alkali metal nitrites, such as sodium molybdates, and sodium nitrite. Thus, the amount of any vapor corrosion inhibitor, if utilized, is small such as about 1.0 weight percent or less, desirably about 0.5 weight percent or less, or nil, that is none at all, based upon the total weight of the one or more biopolymers and the total weight of the one or more fillers. Volatile corrosion inhibitors are avoided because they are chemically reactive and at high extrusion temperatures are deleterious to the biopolymers.

Preparation of the Masterbatch Composition

An important aspect of the present invention is the formation of a masterbatch by mixing the one or more particulate fillers in large amounts by mass/weight, into one or more melted biodegradable thermoplastic resins to produce a uniform distribution thereof. Such high loadings with uniform distribution is difficult, especially with thermal and shear sensitive biodegradable polymers, but has been accomplished by the present invention using high shear equipment such as an extruder and preferably a twin screw extruder with suitable screw elements and geometry. The one or more particulate fillers and the one or more biopolymers can be added together to a high shear extruder or alternatively the filler(s) can be partially or completely added downstream. The temperature of the extruder is desirably above the glass transition temperature of the one or more biopolymers and preferably is above the melting point of the highest melting biopolymer. An extruder is utilized having desirable screw geometry so that sufficient mixing of the various particle fillers and the melted biopolymers occurs to produce a uniform distribution of the one or more discrete fillers in the one or more biopolymers that constitute a continuous phase.

Heretofore, the high throughputs necessary for conventional extruders was difficult, if not impossible with respect to loadings of the particular fillers of the present invention with the viscous and temperature sensitive bipolymers set forth hereinabove. However, it has been found that specially designed screw elements having higher OD/OI (outer diameter to inner diameter of the screw) increases the free volume and permits high loading of the particular filler in a biodegradable, shear and heat sensitive thermoplastic polymer. A suitable OD/OI is at least about 1.6/1, desirably at least about 1.65/1 and preferably at least about 1.7/1. The specific torque is at least 11 Nm/cm$^3$. Since the industry standard is 1.55/1, the result is approximately 35% increase in free volume. Such as suitable screw element is set forth in FIG. 1. The use of extrusion screws having a high OD/OI ratio along with feeding of a partial amount or all of the particular filler downstream allows for higher throughputs that are favorable with regard to commercial operations.

As well known to those skilled in the art, the extruded uniform mixture of the biopolymer(s) and the filler(s) are cut or chopped into desirable masterbatch size particles and dried to a low moisture weight content as noted hereinabove and fully incorporated by reference.

Second or Subsequent Stage

The post masterbatch stage(s), i.e. the second or other subsequent stages in forming various desired items or products relate to taking the dried masterbatch composition, preferably particles, and further physically mixing the same with additional amounts of one or more biodegradable thermoplastic polymers set forth herein above and fully incorporated by reference. The additional polymers are physically mixed with the masterbatch as by extrusion processing using established down stream processing operations such as extruding, blowing or casting operations that form blown or cast films, and molding operations, or the like, to make the final product. When blown, the blow up ratio desirably is from about 2.0 to 3.5 and preferably from about 2.5 to about 3.0. Thus, a preferred embodiment relates to the above-noted two stage process involving the formation of a masterbatch in a first stage preferably using a twin screw extruder having a high OD/ID screw element, along with a second stage melt mixing of additional biopolymer(s) at a temperature above the highest biopolymer melting point in a standard extrusion processing operation, e.g. an extruder such as a polyethylene single screw extruder blown film extrusion line. Such melt temperatures naturally vary with the type of biopolymer(s) utilized and is often from about 150° C. to about 210° C.

The amount of the additional biodegradable thermoplastic polymers utilized in the second stage can be readily calculated based upon the desired final weight ratio of all of the biodegradable polymers to all of the fillers. For example, if the masterbatch weight ratio is 40/60, that is 40 parts by weight of one or more biodegradable polymers to 60 parts by weight of one or more fillers, and the end ratio of the second stage is 70/30, that is 70 parts by weight of one or more biodegradable polymers to 30 parts by weight of one or more fillers, the amount of additional one or more biodegradable polymers added in the second stage is 100 parts by weight. That is, an initial 40 parts by weight in the masterbatch plus an additional 100 parts by weight of additional biodegradable polymers for a total of 140 parts by weight. If no additional fillers are added, the total amount of fillers that was all added in the masterbatch stage remains at 60 parts by weight. Thus, the total amount of biodegradable polymers and fillers in the second stage is 140+60=200 parts by weight. The final ratio of the one or more biodegradable polymers to the one or more fillers in the second stage is thus 40+100/60=140/60 or 70/30. The exact amount of one or more additional biodegradable polymers for other final ratios in the second stage or end blend item or product can also be readily calculated.

The amount of the one or more biodegradable polymers added in the second stage is generally at least 50% by weight based upon the total amount of the one or more biodegradable polymers in the first or masterbatch stage. Desirably, the amount of added biodegradable polymer in the second stage is at least about 100% and even more desirably at least about 150% or at least about 200% by weight based upon the weight of the one or more biopolymers in the first stage. The final or overall amount of the one or more biopolymers that exists in the second stage based upon the final weight of the one or more biopolymers and the one or more inorganic fillers is generally from about 55% to about 85% or about 90% by weight, desirably from about 60% to about 80% by weight and preferably from about 65% to about 75% by weight. The total or final amount of the one or more fillers in the second stage is thus the difference and is from about 10% or about 15% to about 45% by weight, desirably from about 20% to about 40% by weight, and preferably from about 25% to about 35% by weight based upon the total weight of the one or more biopolymers and the one or more fillers.

While various additives, as noted above, can be utilized and added in conventional amounts to the masterbatch, it is generally desired to add such additives to the second stage, that is before and/or during blending of the one or more additional biodegradable thermoplastic polymers with the masterbatch particles.

It has been found that by adding and blending additional one or more biodegradable thermoplastic polymers in the second stage desirably using a standard single screw extruder results in unexpected and improved physical properties as compared to an overall one stage process wherein all of the one or more biodegradable polymers and all of the one or more inorganic fillers are added and melt blended in only a single stage. Improved properties include the following: improved strength at peak load of at least about 20% and desirably at least about 30% or at least about 40%; improved strength at break load of at least about 20% and desirably at least about 30% or at least about 40%; improved peak load of at least about 20% or at least about 30% and desirably at least about 40% or at least about 50%; and improved break load of at least about 20% or at least about 30% and desirably at least about 40% or at least about 50%.

The invention will be better understood by the following examples which serve to illustrate but not to limit the invention.

EXAMPLES

Example 1

60 parts by weight of talc was utilized as a filler and 40 parts by weight of Ecoflex® biodegradable polymer were utilized to form a masterbatch. The talc had a mean diameter particle size of from 0.5 to 20 microns (approximately 99 wt. % of all talc particles) and also had a narrow particle size distribution, see Table 1.

TABLE 1

| Talc | |
|---|---|
| Particle Size | % wt. |
| larger than 20 microns | 6.9 |
| between 15 to 20 microns | 1.3 |
| between 10 to 15 microns | 6.9 |
| between 8 to 10 microns | 7.7 |
| between 6 to 8 microns | 14.5 |
| between 5 to 6 microns | 10.8 |
| between 4 to 5 microns | 13.5 |
| between 3 to 4 microns | 15.8 |
| between 2 to 3 microns | 15.7 |
| between 1.5 to 2 microns | 6.5 |
| smaller than 1.5 microns | 6.4 |
| TOTAL | 100% |

The Ecoflex® biodegradable polymer was a copolymer of butane diol, adipic acid, and terephthalic acid, and had a melt flow index of from about 3.5 to about 6 grams per 10 minutes and a water vapor transition rate of 37.2 g/100 sq. inch/day/normalized to 1 mil. thickness according to ASTM E 398-03.

The talc and biopolymer were not previously physically mixed but rather all of the biopolymer was added through the main port of an extruder. A portion of the talc was added with the biopolymer and the remaining portion was added in a downstream feed port. The melt blending was carried out utilizing a twin-screw extruder having the following conditions:

| Masterbatch Stage | | | | | | | | | | |
|---|---|---|---|---|---|---|---|---|---|---|
| Extruder screw diameter | | | | | | 40 mm | | | | |
| Length over diameter ratio | | | | | | 40 | | | | |
| Temperatures (all in degree of centigrade) | | | | | | | | | | |
| Zone 1 | Zone 2 | Zone 3 | Zone 4 | Zone 5 | Zone 6 | Zone 7 | Zone 8 | Zone 9 | Die |
| 80 | 130 | 140 | 150 | 150 | 150 | 160 | 170 | 160 | 175 |
| Melt temperature | | | 180° C. | | | | | | | |
| Screw speed | | | 600 RPM | | | | | | | |
| Torque | | | 40%-50% | | | | | | | |
| Throughput | | | 100 kg/hr (225 lb/hr) | | | | | | | |
| Feed - Ecoflex ® | | | main feeder | | | | | | | |
| Talc | | | side feed (2 side feeds downstream) | | | | | | | |
| | | | Talc dried at 150 ° C. for 4 hours prior to extrusion | | | | | | | |

The melt-blended biopolymer and talc filler were cooled and granulated or pelletized at the end of the twin-screw extruder. The masterbatch had a melt flow index of from about 13 to about 16 grams per 10 minutes.

Second Stage

Subsequently, the masterbatch pellets were mixed with an additional 100 parts by weight of an Ecoflex® biodegradable polymer also in a twin-screw extruder having the following blown film extruder profile and conditions to yield a final composition having 70 parts by weight of the biodegradable polymer and 30 parts by weight of the filler.

Extruder Profile:
 Standard LLDPE screw
 Zone temperatures at 170° C. to 180° C. (338° F. to 356° F.)
 Die temperatures at 155° C. to 170° C. (311° F. to 338° F.)
 Screen packs 40-60 mesh
 Die gap 20 mil to 100 mil (0.5 mm to 2.5 mm)
 Blow up ratio to be maintained in the range 2.5-3.0
 Dual lip air ring with chilled air
 Chilled or service water on feed throat Extrusion Conditions:
 a) Heat unit to temperature required to melt the polyethylene resin;
 b) charge polyethylene to the line;
 c) set screw speed at 15-20 RPM and purge for 30 minutes;
 d) start-up the bubble to the desired width and thickness, close to values required for the biodegradable film;
 e) increase screw speed to 50 RPM while purging for another 15 minutes and begin to lower all temperatures to the desired value as specified by the extrusion profile shown below;
 f) as the temperatures reach the desired values, charge dried pre-mixed polymer (50% masterbatch composition+ 50% additional biopolymer) and stabilize extrusion conditions;
 g) as purge material runs out and biodegradable resin starts to appear at the die, make sure that all zone and die temperatures are at the desired set points;

h) lower the take-off rate (3-4 feet/minute) and allow bubble to stabilize;
i) slowly change the take-off rate and the screw speed to reach desired width and thickness; and
j) collect material.

The temperature of the extruder at the different zones were as follows:

Blown film extrusion conditions
Temperatures (All in degree centigrade)

| Zone 1 | Zone 2 | Zone 3 | Adaptor | Die |
|---|---|---|---|---|
| 130 | 150 | 170 | 170 | 150 |

Chilled air at the die to cool the bubble immediately rotating die for averaging thickness variations across the circumference of the bubble. A water vapor transition rate of a final blend was approximately 23 g/100 sq. inch/day/normalized to a 1 mil. thickness. Whereas heretofore, the water vapor transition rate generally increased upon blending with an inorganic filler, the present invention actually resulted in a decrease in the water vapor transition rate from 37 of the Ecoflex biodegradable polymer per se to about 23.

Example 2

In a manner similar to Example 1, 40 parts by weight of an Ecoflex® biopolymer and 60 parts by weight of talc having a particle size as noted in Example 1 were mixed within a twin-screw extruder under the following conditions:

masterbatch composition and added to a second twin-screw extruder in a second stage operation. The extrusion process was essentially the same as in Example 1 with the blown film extrusion conditions being as follows:

Second Stage

Blown film extrusion conditions
Temperatures (All in degree centigrade)

| Zone 1 | Zone 2 | Zone 3 | Adaptor | Die 3 | Die 2 | Die 1 |
|---|---|---|---|---|---|---|
| 170 | 175 | 180 | 180 | 175 | 160 | 30 |

Chilled air at the die to cool the bubble immediately rotating die for averaging thickness variations across the circumference of the bubble.

Equal thickness films of the above two stage process of Example 1 were then tested for the physical properties set forth in Table 2. Similarly, the exact same Ecoflex® biodegradable polymer as well as the exact same type of talc was Masterbatch Stage

| Extruder screw diameter | 60 mm |
|---|---|
| Length over diameter ratio | 40 |

Temperatures (all in degree of centigrade)

| Zone 1 | Zone 2 | Zone 3 | Zone 4 | Zone 5 | Zone 6 | Zone 7 | Zone 8 | Zone 9 | Die |
|---|---|---|---|---|---|---|---|---|---|
| 40 | 150 | 155 | 160 | 165 | 170 | 170 | 175 | 165 | 180 |

| Melt temperature | 180° C.-185° C. |
|---|---|
| Screw speed | 400 RPM |
| Torque | 30%-40% |
| Throughput | 350 kg/hr (700 lb/hr) |
| Feed - Ecoflex ® | main feeder 1 |
| Talc | main feeder 2 |
| | Talc dried at 150 ° C. for 4 hours prior to extrusion |

As in Example 1, the melt-blended composition was pelletized at the end of the twin-screw extruder and cooled to ambient temperature. Subsequently, 100 parts by weight of Ecoflex® biodegradable polymer was added to the pelletized blended in a one stage in a 70 to 30 ratio of polymer to filler and extruded under the exact same temperature conditions as the masterbatch approach and data thereof that serves as a Control is also set forth in Table 1.

TABLE 2

| Product | Film Thickness (microns) | Break Elong in mm | Break Load kg | Peak Load kg | % Elong at Break Load | % Elong at Peak Load | Strength at Peak Load kg/cm.sq | Strength at Break Load kg/cm.sq |
|---|---|---|---|---|---|---|---|---|
| 70-30 (Control) | 30.000 | 425.700 | 0.860 | 0.897 | 425.700 | 412.600 | 119.644 | 114.711 |
| Masterbatch-Two Stage Approach | 30.000 | 523.800 | 1.326 | 1.434 | 523.800 | 519.600 | 166.324 | 165.413 |
| Improvement over Control | | 23% | 54% | 50% | 23% | 26% | 39% | 44% |

As apparent from the above data, the two stage or masterbatch approach of the present invention yielded improved properties with respect to all physical tests of at least 20% and in some cases at least 50% or greater.

The materbatch, two-stage prepared biodegradable polymer-inorganic or polymer-organic filler blends of the present invention can be utilized for carry out bags, food and biowaste collection bags, films, agricultural mulch films, films or sheets, molded products, and the like.

While in accordance with the patent statutes the best mode and preferred embodiment have been set forth, the scope of the invention is not limited thereto, but rather by the scope of the attached claims.

What is claimed is:

1. A biodegradable thermoplastic polymer masterbatch composition; consisting essentially of:
a melt blend including particles of at least one particulate filler uniformly dispersed in at least one biodegradable thermoplastic polymer comprising a biodegradable polylactic acid or a biodegradable polylactic acid-based polymer, a copolymer or a blend thereof; a biodegradable aliphatic-aromatic copolyester; a biodegradable aliphatic polyester; a biodegradable polyester amide polymer or copolymer; or a biodegradable cellulose ester or a derivative thereof; or any combination thereof; the amount of said at least one biodegradable thermoplastic polymer ranging from about 25% to about 50% by weight and the amount of said at least one particulate filler ranging from about 50% to about 75% by weight, said percent by weight being based upon the total amount by weight of said at least one biodegradable polymer and said at least one particulate filler;
said at least one particulate filler having a mean particle diameter of from about 0.5 micron to about 40 microns wherein at least about 75% by weight of the particles have a mean particle diameter of from about 0.5 to about 20 microns, and
wherein said biodegradable thermoplastic polymer masterbatch composition optionally has less than about 1% by weight of a volatile corrosion inhibitor therein based upon the total weight of said at least one biodegradable thermoplastic polymer and said at least one particulate filler.

2. The biodegradable polymer masterbatch composition of claim 1, wherein the amount of said at least one biodegradable thermoplastic polymer is from about 30% to about 45% by weight and wherein the amount of said at least one particulate filler is from about 55% to about 70% by weight, and wherein said filler comprises silica, talc, pumice, calcium carbonate, magnesium carbonate, mica, titanium dioxide, zeolite, clay, alumina, glass beads, hollow glass spheres, microspheres, porous ceramic spheres, cellulose, starch, lignocellulosic materials, or proteinaceous compounds, or any combination thereof.

3. The biodegradable polymer masterbatch composition of claim 2, wherein at least about 50% by weight of said particulate fillers have a mean particle diameter of about 2 to about 10 microns, wherein said aliphatic polyester comprises a hydroxyl-alkanoate polyester containing a total of from 2 to 12 carbon atoms, a polycaprolactone or a polyester derived from polycaprolactone, a succinate-based aliphatic polymer, or any combination thereof; and wherein said aliphatic-aromatic copolyester comprises a polymer derived from terephthalic acid and at least one diol, or a polyester derived from an alkyl substituted terephthalic acid or terephthalic acid, at least one aliphatic acid, and at least one aliphatic diol, or any combination thereof, and
wherein said biodegradable thermoplastic polymer masterbatch composition has less than about 0.5% by weight of a corrosion inhibitor therein based upon the total weight of said at least one biodegradable thermoplastic polymer and said at least one particulate filler.

4. The biodegradable polymer masterbatch composition of claim 3, wherein the amount of said at least one biodegradable thermoplastic polymer is from about 35% to about 45% by weight and wherein the amount of said one or more fillers is from about 55% to about 65% by weight, and
wherein said filler comprises talc, silica, calcium carbonate, starch, or cellulose, or any combination thereof.

5. The biodegradable polymer masterbatch composition of claim 4, wherein said biodegradable thermoplastic polymer is derived from terephthalic acid or substituted terephthalic acid, at least one aliphatic acid, and at least one aliphatic diol; wherein at least about 65% of said particulate fillers have a mean particle diameter of from about 2 to about 10 microns, and
wherein said biodegradable thermoplastic polymer masterbatch composition has no corrosion inhibitor therein.

6. A biodegradable polymer composition, comprising:
a masterbatch melt blend comprising particles of at least one particulate filler dispersed in at least one biodegradable thermoplastic polymer comprising a biodegradable aliphatic-aromatic copolyester; a biodegradable polyester amide polymer or copolymer; a derivative thereof; or any combination thereof; the amount of said at least one biodegradable thermoplastic polymer ranging from about 25% to about 50% by weight and the amount of said at least one particulate filler ranging from about 50% to about 75% by weight, said percent by weight being based upon the total amount by weight of said at least one biodegradable polymer and said at least one particulate filler; said at least one particulate filler having a mean particle diameter of from about 0.5 micron to about 40 microns wherein at least about 75% by weight of the particles have a mean particle diameter of from about 0.5 to about 20 microns;
said masterbatch melt blend subsequently blended with at least one additional biodegradable thermoplastic polymer selected from said one or more masterbatch biodegradable thermoplastic polymers, the total amount of said at least one masterbatch biodegradable polymer and said at least one additional biodegradable polymer being from about 55% to about 90% by weight and the total amount of all of said particulate fillers being from about 10% to about 45% by weight based upon the total weight of all of said biodegradable thermoplastic polymers and the total weight of all of said particulate fillers; and wherein said blend composition has a strength at break load of at least 20% greater than the strength of said blend composition compounded in a single stage.

7. The biodegradable polymer composition of claim 6, wherein the amount of said at least one biodegradable thermoplastic polymer is from about 30% to about 45% by weight and wherein the amount of said at least one particulate filler is from about 55% to about 70% by weight, and wherein said filler comprises silica, talc, pumice, calcium carbonate, magnesium carbonate, mica, titanium dioxide, zeolite, clay, alumina, glass beads, hollow glass spheres, microspheres, porous ceramic spheres, cellulose, starch, lignocellulosic materials, or proteinaceous compounds, or any combination thereof; and wherein said blend composition has a strength at break load of at least 30% greater than the strength of said blend composition compounded in a single stage.

8. The biodegradable polymer composition of claim 7, wherein at least about 50% by weight of said particulate fillers have a mean particle diameter of about 2 to about 10 microns, wherein said aliphatic-aromatic copolyester comprises a polymer derived from terephthalic acid and at least one diol, or a polyester derived from an alkyl substituted terephthalic acid or terephthalic acid, at least one aliphatic acid, and at least one aliphatic diol, or any combination thereof;

wherein said biodegradable thermoplastic polymer masterbatch composition has less than about 1.0% by weight of a corrosion inhibitor therein based upon the total weight of said at least one biodegradable thermoplastic polymer and said at least one particulate filler;

the total amount of said at least one masterbatch biodegradable polymer and said at least one additional biodegradable polymer being from about 60% to about 80% by weight and the total amount of all of said particulate fillers being from about 20% to about 40% by weight based upon the total weight of all of said biodegradable thermoplastic polymers and the total weight of all of said particulate fillers; and wherein said blend composition has a strength at break load of at least 40% greater than the strength of said blend composition compounded in a single stage.

9. The biodegradable polymer composition of claim 8, wherein the amount of said at least one biodegradable thermoplastic polymer is from about 35% to about 45% by weight and wherein the amount of said one or more fillers is from about 55% to about 65% by weight, wherein said filler comprises talc, silica, calcium carbonate, starch, or cellulose, or any combination thereof.

10. The biodegradable polymer composition of claim 6, wherein said biodegradable thermoplastic polymer is derived from terephthalic acid or substituted terephthalic acid, at least one aliphatic acid, and at least one aliphatic diol; wherein at least about 65% of said particulate fillers have a mean particle diameter of from about 2 to about 10 microns, wherein said biodegradable thermoplastic polymer masterbatch composition has no corrosion inhibitor therein;

the total amount of said at least one masterbatch biodegradable polymer and said at least one additional biodegradable polymer being from about 65% to about 75% by weight and the total amount of all of said particulate fillers being from about 25% to about 35% by weight based upon the total weight of all of said biodegradable thermoplastic polymers and the total weight of all of said particulate fillers.

11. A process for forming a blend of at least one biodegradable polymer and at least one particulate filler, comprising the steps of:

forming a biodegradable thermoplastic polymer masterbatch composition by melt blending in a high shear extruder having an outer diameter/inner diameter screw ratio of at least about 1.6/1 at least one particulate filler and at least one biodegradable thermoplastic polymer comprising a biodegradable polylactic acid or a biodegradable polylactic acid-based polymer, a copolymer, or a blend thereof; a biodegradable aliphatic-aromatic copolyester; a biodegradable aliphatic polyester; a biodegradable polyesteramide polymer or copolymer; or a biodegradable cellulose or a derivative thereof; or any combination thereof; said particulate filler having a mean particle diameter of from about 0.5 micron to about 40 microns wherein at least about 75% by weight of the particles have a mean particle diameter of from about 0.5 to about 20 microns, said melt blending occurring at a temperature above the melting point of the highest melting point biodegradable thermoplastic polymer, the amount of said at least one biodegradable thermoplastic polymer ranging from about 25% to about 50% by weight and the amount of said at least one particulate filler ranging from about 50% to about 75% by weight, said percent by weight being based upon the total amount by weight of said at least one biodegradable polymer and said at least one filler, subsequently adding and melt blending at least one additional biodegradable thermoplastic polymer selected from said one or more masterbatch biodegradable thermoplastic polymers, the total amount of said at least one masterbatch biodegradable polymer and said at least one additional biodegradable thermoplastic polymer being from about 55% to about 90% by weight and the total amount of all of said particulate fillers being from about 10% to about 45% by weight based upon the total weight of all of said biodegradable thermoplastic polymers and the total weight of all of said particulate fillers, said blending said being at a temperature above the melting point of the highest melting point biodegradable thermoplastic polymer; and wherein said blend composition has a WVTR according to ASTM E 398-03 of about 30 or less.

12. The process for forming a blend of at least one biodegradable polymer and at least one particulate filler of claim 11, wherein the amount of said at least one masterbatch biodegradable thermoplastic masterbatch polymer in said masterbatch is from about 30% to about 45% by weight;

wherein the amount of said at least one particulate filler in said masterbatch is from about 55% to about 70% by weight, wherein said filler comprises silica, talc, pumice, calcium carbonate, magnesium carbonate, mica, titanium dioxide, zeolite, clay, alumina, glass beads, hollow glass spheres, microspheres, porous ceramic spheres, cellulose, starch, lignocellulosic materials, or proteinaceous compounds, or any combination thereof;

wherein said melt blending of said masterbatch blend occurs in a high shear extruder having an outer diameter/inner diameter screw ratio of about 1.65/1;

wherein said blend composition has a WVTR according to ASTM E 398-03 of about 25 or less, and wherein said blend composition has a break load strength of at least 20% greater than the strength of said blend composition compounded in a single stage.

13. The process for forming a blend of at least one biodegradable polymer and at least one particulate filler of claim 12, wherein the total amount of said at least one masterbatch biodegradable polymer and said at least one additional biodegradable polymer is from about 60% to about 80% by weight and the total amount of all of said particulate fillers being from about 20% to about 40% by weight based upon the total weight of all of said biodegradable thermoplastic polymers and the total weight of all of said particulate fillers, wherein at least about 50% by weight of said particulate fillers have a mean particle diameter of about 2 to about 10 microns; wherein said aliphatic polyester comprises a hydroxyl-alkanoate polyester containing a total of from 2 to 12 carbon atoms, a polycaprolactone a polyester derived from polycaprolactone, a succinate-based aliphatic polymer, or any combination thereof; and wherein said aliphatic-aromatic copolyester comprises a polymer derived from terephthalic acid and at least one diol, or a polyester derived from an alkyl substituted terephthalic acid or terephthalic acid, at least one aliphatic acid, and at least one aliphatic diol, or any combination thereof;

wherein said blend of all of said biodegradable thermoplastic polymers and all of said particulate fillers has less than about 0.5% by weight of a corrosion inhibitor therein based upon the total weight of all of said biodegradable thermoplastic polymers and all of said particulate fillers, wherein said high shear extruder of said masterbatch is a twin screw extruder;

wherein said blend composition has a WVTR according to ASTM E 398-03 of about 20 or less; and wherein said blend composition has a break load strength of at least 30% greater than the strength of said blend composition compounded in a single stage.

14. The process for forming a blend of at least one biodegradable polymer and at least one particulate filler of claim 13, wherein the amount of said at least one masterbatch biodegradable thermoplastic masterbatch polymer in said masterbatch is from about 35% to about 45% by weight and wherein the amount of said one or more fillers in said masterbatch is from about 55% to about 65% by weight;

wherein said particulate filler comprises talc, silica, calcium carbonate, starch, or cellulose, or any combination thereof;

wherein said melt blending of said masterbatch blend occurs in a high shear extruder having an outer diameter/ inner diameter screw ratio of at least about 1.7/1; and wherein said blend composition has no corrosion inhibitor therein.

15. The process for forming a blend of at least one biodegradable polymer and at least one particulate filler of claim 14, wherein said biodegradable thermoplastic polymer is derived from terephthalic acid or substituted terephthalic acid, at least one aliphatic acid, and at least one aliphatic diol; wherein at least about 65% of said particulate fillers have a mean particle diameter of from about 2 to about 10 microns;

wherein said blend composition has a WVTR according to ASTM E 398-03 of about 15 or less; and wherein said blend composition has a break strength of at least 40% greater than the strength of said blend composition compounded in a single stage.

16. The process for forming a blend of at least one biodegradable polymer and at least one particulate filler of claim 11, wherein the amount of said at least one masterbatch biodegradable thermoplastic masterbatch polymer in said masterbatch is from about 30% to about 45% by weight;

wherein the amount of said at least one particulate filler in said masterbatch is from about 55% to about 70% by weight, wherein said filler comprises silica, talc, pumice, calcium carbonate, magnesium carbonate, mica, titanium dioxide, zeolite, clay, alumina, glass beads, hollow glass spheres, microspheres, porous ceramic spheres, cellulose, starch, lignocellulosic materials, or proteinaceous compounds, or any combination thereof;

wherein said melt blending of said masterbatch blend occurs in a high shear extruder having an outer diameter/ inner diameter screw ratio of about 1.65/1, wherein said aliphatic polymer comprises a hydroxyl-alkanoate polyester containing a total of from 2 to 12 carbon atoms, a polycaprolactone, a polyester derived from polycaprolactone, a succinate-based aliphatic polymer, or any combination thereof; and wherein said aliphatic-aromatic copolyester comprises a polymer derived from terephthalic acid and at least one diol, or a polyester derived from an alkyl substituted terephthalic acid or terephthalic acid, at least one aliphatic acid, and at least one aliphatic diol, or any combination thereof.

17. The process for forming a blend of at least one biodegradable polymer and at least one particulate filler of claim 16, wherein said particulate filler comprises talc, silica, calcium carbonate, starch, or cellulose, or any combination thereof;

wherein the amount of fillers added in said masterbatch stage is at least 75% by weight of the total filler based upon the weight of the final blended biodegradable polymer-particulate filler composition; and wherein said biodegradable thermoplastic polymer is derived from terephthalic acid or substituted terephthalic acid, at least one aliphatic acid, and at least one aliphatic diol.

18. The process for forming a blend of at least one biodegradable polymer and at least one particulate filler of claim 17, wherein the total amount of said at least one masterbatch biodegradable polymer and said at least one additional biodegradable polymer is from about 60% to about 80% by weight and the total amount of all of said particulate fillers being from about 20% to about 40% by weight based upon the total weight of all of said biodegradable thermoplastic polymers and the total weight of all of said particulate fillers, wherein at least about 50% by weight of said particulate fillers have a mean particle diameter of about 2 to about 10 microns; and wherein the amount of fillers added in said masterbatch stage is at least 85% by weight of the total filler based upon the weight of the final blended biodegradable polymer-particulate filler composition.

19. The process for forming a blend of at least one biodegradable polymer and at least one particulate filler of claim 17, wherein said high shear extruder of said masterbatch is a twin screw extruder.

20. The process for forming a blend of at least one biodegradable polymer and at least one particulate filler of claim 16,
wherein said polymer added after said masterbatch stage is subjected to only one heat history.

21. A process for forming a blend of at least one biodegradable polymer and at least one particulate filler, comprising the steps of:
forming a biodegradable thermoplastic polymer masterbatch composition by melt blending at least one particulate filler and at least one biodegradable thermoplastic polymer comprising a biodegradable polylactic acid or a biodegradable polylactic acid-based polymer, a copolymer, or a blend thereof; a biodegradable aliphatic-aromatic copolyester; a biodegradable aliphatic polyester; a biodegradable polyesteramide polymer or copolymer; or a biodegradable cellulose or a derivative thereof; or any combination thereof; said particulate filler having a mean particle diameter of from about 0.5 micron to about 40 microns, said melt blending occurring at a temperature above the melting point of the highest melting point biodegradable thermoplastic polymer, the amount of said at least one biodegradable thermoplastic polymer ranging from about 25% to about 50% by weight and the amount of said at least one particulate filler ranging from about 50% to about 75% by weight, said percent by weight being based upon the total amount by weight of said at least one biodegradable polymer and said at least one filler,
subsequently adding and melt blending at least one additional biodegradable thermoplastic polymer selected from said one or more masterbatch biodegradable thermoplastic polymers, the total amount of said at least one masterbatch biodegradable polymer and said at least one additional biodegradable thermoplastic polymer being from about 55% to about 90% by weight and the total amount of all of said particulate fillers being from about 10% to about 45% by weight based upon the total weight of all of said biodegradable thermoplastic polymers and the total weight of all of said particulate fillers, and said blending said being at a temperature above the melting point of the highest melting point biodegradable thermoplastic polymer.

22. The process for forming a blend of at least one biodegradable polymer and at least one particulate filler of claim 21,
wherein the amount of said at least one masterbatch biodegradable thermoplastic masterbatch polymer in said masterbatch is from about 30% to about 45% by weight;
wherein the amount of said at least one particulate filler in said masterbatch is from about 55% to about 70% by weight, wherein said filler comprises silica, talc, pumice, calcium carbonate, magnesium carbonate, mica, titanium dioxide, zeolite, clay, alumina, glass beads, hollow glass spheres, microspheres, porous ceramic spheres, cellulose, starch, lignocellulosic materials, or proteinaceous compounds, or any combination thereof.

23. The process for forming a blend of at least one biodegradable polymer and at least one particulate filler of claim 22,
wherein the total amount of said at least one masterbatch biodegradable polymer and said at least one additional biodegradable polymer is from about 60% to about 80% by weight and the total amount of all of said particulate fillers being from about 20% to about 40% by weight based upon the total weight of all of said biodegradable thermoplastic polymers and the total weight of all of said particulate fillers,
wherein at least about 75% by weight of said particulate fillers have a mean particle diameter of about 0.5 to about 30 microns; wherein said aliphatic polyester comprises a hydroxyl-alkanoate polyester containing a total of from 2 to 12 carbon atoms, a polycaprolactone a polyester derived from polycaprolactone, a succinate-based aliphatic polymer, or any combination thereof; and wherein said aliphatic-aromatic copolyester comprises a polymer derived from terephthalic acid and at least one diol, or a polyester derived from an alkyl substituted terephthalic acid or terephthalic acid, at least one aliphatic acid, and at least one aliphatic diol, or any combination thereof; and
wherein said blend of all of said biodegradable thermoplastic polymers and all of said particulate fillers has less than about 0.5% by weight of a corrosion inhibitor therein based upon the total weight of all of said biodegradable thermoplastic polymers and all of said particulate fillers.

24. The process for forming a blend of at least one biodegradable polymer and at least one particulate filler of claim 23,
wherein the amount of said at least one masterbatch biodegradable thermoplastic masterbatch polymer in said masterbatch is from about 35% to about 45% by weight and wherein the amount of said one or more fillers in said masterbatch is from about 55% to about 65% by weight;
wherein said particulate filler comprises talc, silica, calcium carbonate, starch, or cellulose, or any combination thereof;
wherein said high shear extruder of said masterbatch is a twin screw extruder; and
wherein said blend composition has a break load strength of at least 20% greater than the strength of said blend composition compounded in a single stage.

25. The process for forming a blend of at least one biodegradable polymer and at least one particulate filler of claim 24, wherein said biodegradable thermoplastic polymer is derived from terephthalic acid or substituted terephthalic acid, at least one aliphatic acid, and at least one aliphatic diol; wherein at least about 55% of said particulate fillers have a mean particle diameter of from about 2 to about 10 microns;
wherein said blend composition has a break strength of at least 30% greater than the strength of said blend composition compounded in a single stage.

26. A biodegradable polymer composition, comprising:
a masterbatch melt blend comprising particles of at least one particulate filler dispersed in at least one biodegradable thermoplastic polymer comprising a biodegradable polylactic acid or a biodegradable polylactic acid-based polymer, copolymer or blend thereof; a biodegradable aliphatic-aromatic copolyester; a biodegradable aliphatic polyester; a biodegradable polyester amide polymer or copolymer; or a biodegradable cellulose ester or a derivative thereof; or any combination thereof; the amount of said at least one biodegradable thermoplastic polymer ranging from about 25% to about 50% by weight and the amount of said at least one particulate filler ranging from about 50% to about 75% by weight, said percent by weight being based upon the total amount by weight of said at least one biodegradable polymer and said at least one particulate filler; said at least one particulate filler having a mean particle diameter of from about 0.5 micron to about 40 microns wherein at least about 75% by weight of the particles have a mean particle diameter of from about 0.5 to about 20 microns;

said masterbatch melt blend subsequently blended with at least one additional biodegradable thermoplastic polymer selected from said one or more masterbatch biodegradable thermoplastic polymers, the total amount of said at least one masterbatch biodegradable polymer and said at least one additional biodegradable polymer being from about 55% to about 90% by weight and the total amount of all of said particulate fillers being from about 10% to about 45% by weight based upon the total weight of all of said biodegradable thermoplastic polymers and the total weight of all of said particulate fillers; and wherein said blend composition has a break load of at least 20% greater than the break load of said blend composition compounded in a single stage.

27. The biodegradable polymer composition of claim 26, wherein the amount of said at least one biodegradable thermoplastic polymer is from about 30% to about 45% by weight and wherein the amount of said at least one particulate filler is from about 55% to about 70% by weight, and wherein said filler comprises silica, talc, pumice, calcium carbonate, magnesium carbonate, mica, titanium dioxide, zeolite, clay, alumina, glass beads, hollow glass spheres, microspheres, porous ceramic spheres, cellulose, starch, lignocellulosic materials, or proteinaceous compounds, or any combination thereof; and wherein said blend composition has a break load of at least 30% greater than the break load of said blend composition compounded in a single stage.

28. The biodegradable polymer composition of claim 27, wherein at least about 50% by weight of said particulate fillers have a mean particle diameter of about 2 to about 10 microns, wherein said aliphatic polyester comprises a hydroxyl-alkanoate polyester containing a total of from 2 to 12 carbon atoms, a polycaprolactone or a polyester derived from polycaprolactone, a succinate-based aliphatic polymer, or any combination thereof; and wherein said aliphatic-aromatic copolyester comprises a polymer derived from terephthalic acid and at least one diol, or a polyester derived from an alkyl substituted terephthalic acid or terephthalic acid, at least one aliphatic acid, and at least one aliphatic diol, or any combination thereof;

wherein said biodegradable thermoplastic polymer masterbatch composition has less than about 1.0% by weight of a corrosion inhibitor therein based upon the total weight of said at least one biodegradable thermoplastic polymer and said at least one particulate filler;

the total amount of said at least one masterbatch biodegradable polymer and said at least one additional biodegradable polymer being from about 60% to about 80% by weight and the total amount of all of said particulate fillers being from about 20% to about 40% by weight based upon the total weight of all of said biodegradable thermoplastic polymers and the total weight of all of said particulate fillers.

29. The biodegradable polymer composition of claim 28, wherein the amount of said at least one biodegradable thermoplastic polymer is from about 35% to about 45% by weight and wherein the amount of said one or more fillers is from about 55% to about 65% by weight, wherein said filler comprises talc, silica, calcium carbonate, starch, or cellulose, or any combination thereof; and wherein said blend composition has a break load of at least 40% greater than the break load of said blend composition compounded in a single stage.

30. The biodegradable polymer composition of claim 26, wherein said biodegradable thermoplastic polymer is derived from terephthalic acid or substituted terephthalic acid, at least one aliphatic acid, and at least one aliphatic diol; wherein at least about 65% of said particulate fillers have a mean particle diameter of from about 2 to about 10 microns, wherein said biodegradable thermoplastic polymer masterbatch composition has no corrosion inhibitor therein;

the total amount of said at least one masterbatch biodegradable polymer and said at least one additional biodegradable polymer being from about 65% to about 75% by weight and the total amount of all of said particulate fillers being from about 25% to about 35% by weight based upon the total weight of all of said biodegradable thermoplastic polymers and the total weight of all of said particulate fillers.

* * * * *

UNITED STATES PATENT AND TRADEMARK OFFICE
CERTIFICATE OF CORRECTION

PATENT NO. : 8,008,373 B2
APPLICATION NO. : 11/981003
DATED : August 30, 2011
INVENTOR(S) : Ramani Narayan et al.

It is certified that error appears in the above-identified patent and that said Letters Patent is hereby corrected as shown below:

Claim 6, Column 14, line 52, after "copolymer;", please insert --or a biodegradable cellulose ester or--.

Signed and Sealed this
Sixth Day of December, 2011

David J. Kappos
*Director of the United States Patent and Trademark Office*